HIGH INFORMATION DENSITY DATA RECORD AND READOUT DEVICE

Filed Sept. 27, 1962

INVENTOR.
LYSLE D. CAHILL
BY Robert B. Harmon
ATTORNEY

INVENTOR.
LYSLE D. CAHILL
BY Robert B Harmon
ATTORNEY

Feb. 28, 1967 L. D. CAHILL 3,307,020

HIGH INFORMATION DENSITY DATA RECORD AND READOUT DEVICE

Filed Sept. 27, 1962 3 Sheets-Sheet 3

INVENTOR.
LYSLE D. CAHILL

BY Robert B Harmon

ATTORNEY 3,307,020
HIGH INFORMATION DENSITY DATA RECORD AND READOUT DEVICE

Lyle D. Cahill, Dayton, Ohio, assignor to Data Corporation, Dayton, Ohio, a corporation of Ohio Filed Sept. 27, 1962, Ser. No. 226,543
20 Claims. (Cl. 235—61.11)

This invention relates generally to data transcription and readout devices, and more particularly to an improved high information density data record and readout device.

Modern research in the field of data storage has given rise to the development of data storage and data sensing methods and instrumentation which render feasible the widespread utilization of techniques predicated upon the analysis of previously recorded data. The increasing reliance of both government and private industry upon technological processes requiring the storage and interpretation of data control information or the interpretation of previously stored data has led to a constantly increasing demand for improved transcribing and readout equipment for data storage uses. A specific need has arisen for improved data storage and readout equipment having the capability to transcribe a large volume of data within the confines of a minute area on the surface of a recording medium or to readout data so transcribed.

One effective method for storing data information for subsequent use incorporates the technique of transcribing data upon a photosensitive film material. This transcription process might incorporate the employment of photosensitive material such as silver halide film materials, diazo materials, or any other materials which achieve a change in density or color when subjected to radiation. The data stored upon photosensitive materials of this type may be read out by electro-optical devices now in existence such as spectrophotometers and automatic densitometers. However, the electro-optical data readout units now in common usage are severely limited in their ability to accurately interpret data transcribed within the confines of a small area on the surface of a recording medium. For example, microdensitometers presently in existence are noted for an ability to obtain data from a film sample having a relatively small area. Standard microdensitometers illuminate the area to be measured with a source of illumination having a regulated intensity, and the area image produced is then enlarged by a lens system and focused upon a slit. A photomultiplier or similar light sensitive transducing means is placed behind the slit, and the area image produced is moved by means of a scanning mechanism so that the light falling upon the slit varies in intensity due to the density variations of the film material under analysis. The smallest area that can be scanned by existing microdensitometers is approximately 100 square microns, and therefore, if the response of a particular film sample is to be measured utilizing a two micron width slit, the sample must be 50 microns in length. This sample length gives rise to disadvantages which tend to cause inaccuracies in the final measurement obtained, as the prolonged 50 micron scan lowers the signal to noise ratio of the electrical output from the device and also averages out the pattern characteristic of the specimen being analyzed.

The many disadvantages occurring with the operation of standard microdensitometers might be eliminated if the microdensitometers had the capability to analyze a film sample without utilizing the aforementioned slit structure. However, if the slit were removed from the microdensitometer, the sharply defined image provided by the slit would not be obtained, as the analyzed image area transmitted to the output photoelectric pickup device would be defined by the illuminated area produced upon the specimen and the construction of the pickup optics of the microdensitometer. In actuality, the specimen would be illuminated by a spot of light transmitted directly from a projector within the microdensitometer, and this spot of light would then be passed through the pickup optics to the photoelectric pickup device. A spot projection technique of this type is not feasible in the standard microdensitometers, as the employment of slit structures is necessary to insure the provision of a sharply defined radiation signal to the illuminated area of the specimen and also from the illuminated area to the photo pickup device. This definition is not forthcoming when an undefined projected spot of light is utilized, for the projected light intensity of the spot tends to deteriorate adjacent the outer extremities of the illuminated area, and this deterioration in the light signal transmitted to the photoelectric pickup device is increased by the intervening pickup optics. Also, minus the area limiting feature provided by the slit structure, the light signal transmitted to the photoelectric pickup device would represent a minimum area of at least 100 square microns. Thus, no resolution of data contained within an area of less than 100 square microns could be obtained if the slit structure were omitted from the microdensitometer.

Ideally, if a clearly defined spot of light producing an area of illumination in the order of one micron could be established, the disadvantages inherent in standard microdensitometers would be abolished. With a projected one micron spot, a large volume of digital data could be stored and subsequently read out from a minute area of a sensitized storage medium. Also, data regarding the density and other characteristics of extremely small areas of a sensitized film specimen could be obtained. However, it has previously been deemed impractical to attempt data storage and readout or specimen analysis through the use of spotlight techniques, as no projection apparatus for providing a clearly defined spot of light having an area of approximately one micron has been developed. Recently established fiber optic techniques have accomplished the transmission of a minute amount of radiant energy, but the energy losses attendant with fiber optic transmission devices have rendered the use of such devices unfeasible for producing a small spot of sufficient intensity for data readout purposes. If such a small spot of sufficient intensity were produced by fiber optic techniques, the problem to accurate data analysis presented by the lack of definition at the periphery of the spot of transmitted light would still exist. Also, damage to the film specimen or storage medium under analysis might arise, as a one micron spot of sufficient intensity for data readout would tend to burn the specimen under observation.

It is a primary object of this invention to provide an improved high information density data record and readout device having the capability to transcribe or analyze data within the confines of a minute area on a storage medium.

Another object of this invention is to provide a high information density data record and readout device incorporating an improved projection system which has the capability to project radiated energy onto a plane with the interception area of the energy constituting a sharply defined illumination area in the order of one micron.

A further object of this invention is to provide an improved high information density data record and readout device which incorporates an accurate specimen positioning system for positioning a moving specimen to facilitate the removal of data therefrom by means of a projected spot of radiant energy having a diameter in the order of one micron and an electro-optical readout system.

Another object of this invention is to provide an improved high information density data record and readout device which includes a novel projection system capable of providing a sharply defined spot of radiant energy in the order of one micron and which has an illumination intensity which permits density readings to a log density of 3.0.

A further object of this invention is to provide a high information density data record and readout device which incorporates a projection system having a collimating aperture which provides an intense source of light to a small area and which limits the light illuminating this area to light of the shorter wave lengths to eliminate undesirable heating of the area.

A still further object of this invention is to provide an improved method for transcribing and reading data from a storage medium through the utilization of a spot of radiant energy having an area in the order of one micron.

With the foregoing and other objects in view, the invention resides in the following specification and appended claims, certain embodiments and details of the construction of which are illustrated in the accompanying drawings in which:

Figures 1, 2, 3:
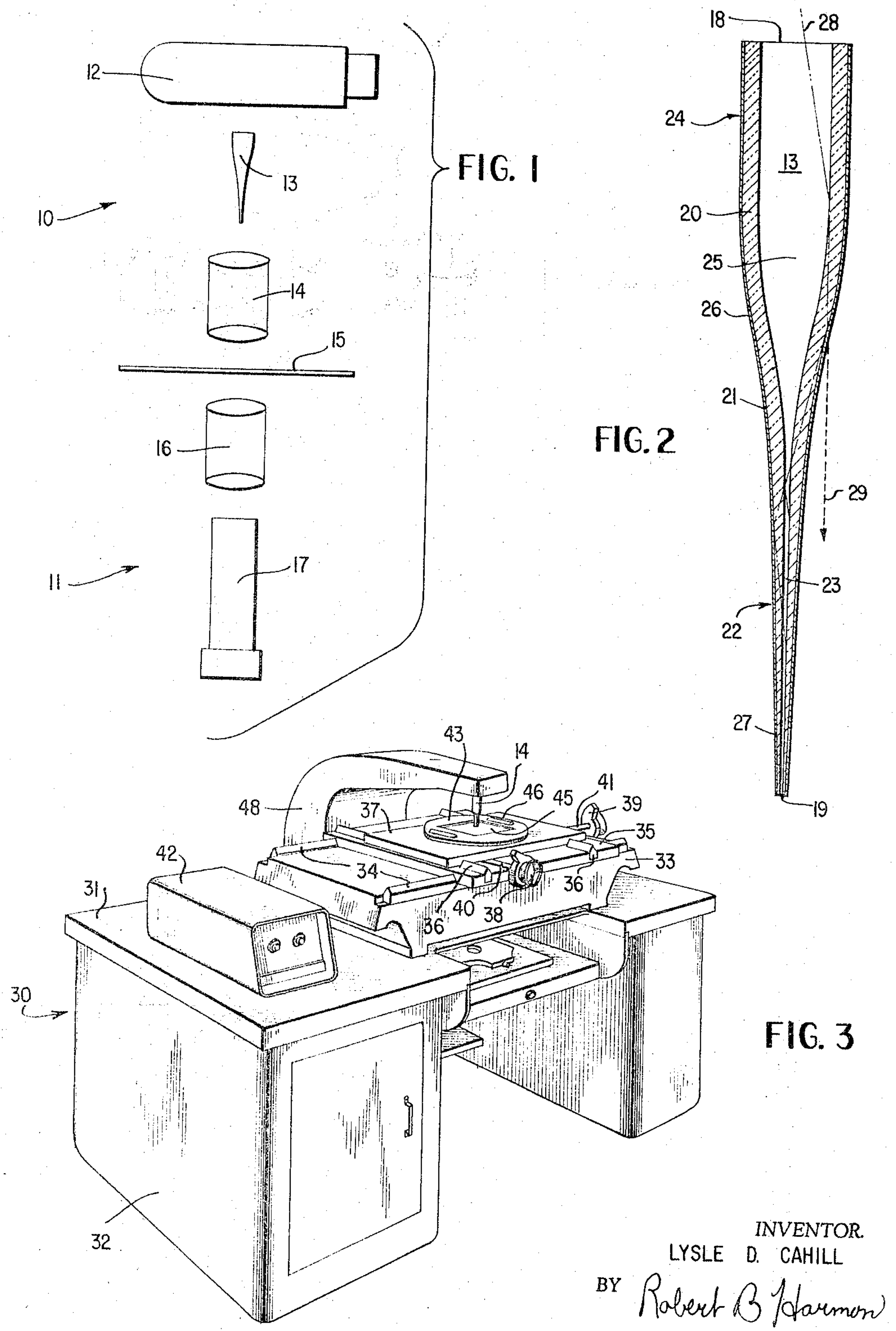
FIGURE 1 illustrates an optical schematic diagram of the optical system incorporated within the high information density data record and readout device of the present invention.
FIGURE 2 is a longitudinal sectional view of the special aperture of FIGURE 1.
FIGURE 3 illustrates a perspective view of the high information density data record and readout device of the present invention.

Basically, the high information density data record and readout device of the present invention includes a projection system having the capability to project a sharply defined spot of radiant energy of a diameter in the order of one micron, a highly accurate scanning system capable of moving a specimen of photosensitive material at various rates and in various directions in a plane at right angles to the axis of the energy transmitted from the projection source, a specimen holding and positioning unit capable of retaining a moving specimen in a predetermined plane without causing injury to the specimen, and a sensitive pickup system aligned with the projection system for sensing changes in the radiated energy when a specimen is moved between the projection system and the pickup system. If the projection system having the capability to produce a well defined spot of illumination having a diameter of one micron were omitted, the basic description of the present invention would appear to relate to a multiplicity of radiant energy measuring instruments now in existence. However, as will be seen from the forthcoming explanation of the drawings, the high information density data record and readout device of the present invention constitutes a plurality of inter-related systems which cooperate to perform data analysis functions heretofore unattainable with presently known instruments.

Many of the features which render the high information density data record and readout device of the present invention unique lie in the construction of a projection system which incorporates the ability to project radiant energy onto a plane with the interception area of the energy sharply defined as a circle whose diameter is in the order of one micron. This projection system, as illustrated by the optical schematic of FIGURE 1, operates without the slit definition units commonly utilized in prior instruments, and therefore eliminates the disadvantages attendant with these slit units. From FIGURE 1, it may be noted that the high information density data record and readout device of the present invention incorporates an optical projection system indicated generally at 10, and an electro-optical pickup system indicated generally at 11. The projection system 10 consists of a tungsten or similar light source 12 which may be focused by well known optical means upon a special collimating aperture 13. The radiant energy passed from the light source 12 through the special aperture 13 is then focused by a microscope objective lens 14 upon a specimen 15. Specimen 15 may constitute any suitable specimen to be analyzed, and thus may include photosensitive material or films of various types which are capable of passing radiant energy.

The optical pickup system 11 includes a microscope pickup objective 16 which focuses the radiant energy passing through the film specimen 15 upon a photomultiplier or other suitable light transducing mechanism 17.

To more adequately comprehend the unique projection capabilities of the projection system 10 of FIGURE 1, reference must be made to FIGURE 2 which provides a greatly enlarged illustration of the special aperture 13 of FIGURE 1. In actuality, the special aperture 13 resembles, somewhat, the well known hypodermic needle, for the aperture constitutes a tube-like structure which is tapered from a large entrance orifice 18 at one end to a small exit orifice 19 at the opposite end. The aperture 13 is somewhat funnel-like in appearance and incorporates a gently tapered tubular wall 20 which tapers inwardly from a point adjacent the entrance orifice 18 to a point 21 where the inward taper then becomes less defined. From point 21 to a terminal point adjacent the exit orifice 19, the wall 20 incorporates only a slight inward taper to define an elongated capillary section 22. Capillary section 22 includes a central bore 23 which terminates at orifice 19, and it may be noted that tubular wall 21, which defines the bore 23, decreases in thickness from point 21 to the terminal portion thereof adjacent the exit orifice 19. Although the bore 23 of capillary section 22 decreases in diameter from point 21 to the terminus thereof at the exit orifice 19, this decrease in diameter is not abrupt but is distributed throughout the length of the elongated capillary section 22. Prior to point 21, the wall 20 defines an enlarged entrance section 24 having a bore 25 which decreases in diameter from a point adjacent the entrance orifice 18 to point 21. The taper of the bore 25 and the entrance section 24 is greater than that of the capillary section 22.

Special aperture 13 is preferably constructed of glass tubing, although other suitable tubing might be utilized, and the diameter of the entrance orifice 18 is determined by the focusing characteristics of the pre-focused light or illumination source 12 of FIGURE 1. Entrance orifice 18 must be of sufficient diameter to receive maximum radiation from the pre-focused source 12, and yet must not be of such diameter to require that the wall 20 be extremely tapered from the terminus adjacent orifice 18 to point 21, as an extreme taper would permit increased light losses through the wall 20. For commonly known pre-focused tungsten light sources, the glass tubing utilized to construct the special aperture 13 may have an outside diameter of seven millimeters and an inside diameter of about four millimeters adjacent the orifice 18. The tubing is then formed by drawing or other suitable methods to attain an internal diameter of .001 inch at the exit orifice 19.

The outside surface of glass wall 20 of the special aperture 13 is coated with a coating layer 26 having selective reflecting characteristics. Layer 26 is constructed from a material having a thickness which permits high reflectivity for short wave lengths of light while exhibiting low reflectivity for long wave lengths of light. Thus, short wave lengths of light in the visible spectrum are reflected and re-reflected within the special aperture 13 by the coating layer 26, while the long wave lengths of light in the red and infrared regions are transmitted through the coating 26 and are not re-reflected within the special aperture 13. The reflecting layer 26 may constitute a coating of aluminum, nickel, chrome, platinum, silver, stainless steel, or similar material having the desired reflectance characteristics, and is usually uniform throughout the length of the special aperture 13. However, adjacent the exit orifice 19, the coating 26 is tapered outwardly to achieve an increased thickness as indicated at 27. The thickened portion 27 of the coating 26 renders the section of the wall 20 adjacent the exit orifice 19 completely opaque, so that light emitting from the exit orifice is not diffused through the section of the wall 20 defined by the opaque coated portion 27, and thus a sharply defined radiant beam is obtained.

In the operation of the projection and optical pickup system 10 and 11 of FIGURES 1 and 2, radiant energy is projected from the pre-focused source 12 into the entrance orifice 18 of the special aperture 13. This incoming ray of radiant energy, indicated schematically at 28 in FIGURE 2, passes through the glass wall 20 of the special aperture and impinges upon the reflective coating 26. The reflective coating 26 transmits the long wave lengths of light indicated at 29 in FIGURE 2 while reflecting and re-reflecting the short wave lengths of light within the bore sections 23 and 25 of the special aperture. Thus, the short wave lengths of light are further concentrated and also tend to become collimated by the long tube effect of the capillary section. The resultant light emitted at the exit orifice 19 is an extremely bright collimated light beam which is sharply defined by the opaque wall construction surrounding the exit orifice. This light beam is substantially devoid of the long wave lengths of light in the red and infrared regions, and thereby the radiant energy which would cause heating of the specimen 15 has been eliminated. Thus, the light emitted from the exit orifice 19 may be focused upon a film specimen by the microscope objective 14 which optically reduces the size of the aperture from .001 inch to one micron. As the special aperture 13 has reduced the diameter of the emitted light beam, this beam passes through only the center portion of the microscope objective lens 14 and does not impinge upon the complete surface of the lens. Thus, only the center of the microscope objective lens 14 is used for focusing purposes, and light losses through the peripheral edges of the lens are eliminated. The sharply defined beam emitted by the special aperture 13 is therefore transmitted by the microscope objective 14 to produce a sharply defined spot of illumination on the specimen 15. This sharply defined light spot, having a one micron diameter, is of sufficient intensity to readout density values on intercepted specimens to a value of log density 3.0 with standard photomultiplier receptors and no harm to standard photographic film materials. Thus, a sharp, well defined spot of light having a one micron diameter may be effectively focused upon a specimen without the use of previously known slit constructions, and the resultant energy passing through the specimen may be received by a pickup microscope objective 16 and focused upon a photomultiplier 17 to achieve a desired electrical output for a recorder or similar device. Although the spot produced upon the film specimen 15 has been described as being circular in configuration, it is obvious that any desired shape could be achieved.

Even though the projection system 10 illustrated by FIGURES 1 and 2, when properly assembled, would be capable of projecting a sharply defined light spot having a one micron diameter upon a film specimen, this projection system would be useless in the absence of a suitable mechanical construction to accurately control the positioning of the projection system 10, the optical pickup system 11, and the specimen 15. The minute character of the light spot produced by the projection system requires that extreme accuracy of positioning and focusing be maintained throughout both the projection system and the pickup optical system for the retention of the projected light spot. For example, the collimated nature of the radiant energy emitted from the special aperture 13 requires that the microscope objective 14 be positioned in a definite angular relationship to the special aperture if the radiated energy is to be focused and transmitted by the objective 14. If the microscope objective 14 is slightly removed from this required angular relationship with the special aperture 13, no light will pass from the special aperture 13 through the microscope objective 14 to the specimen 15.

Figure 4:
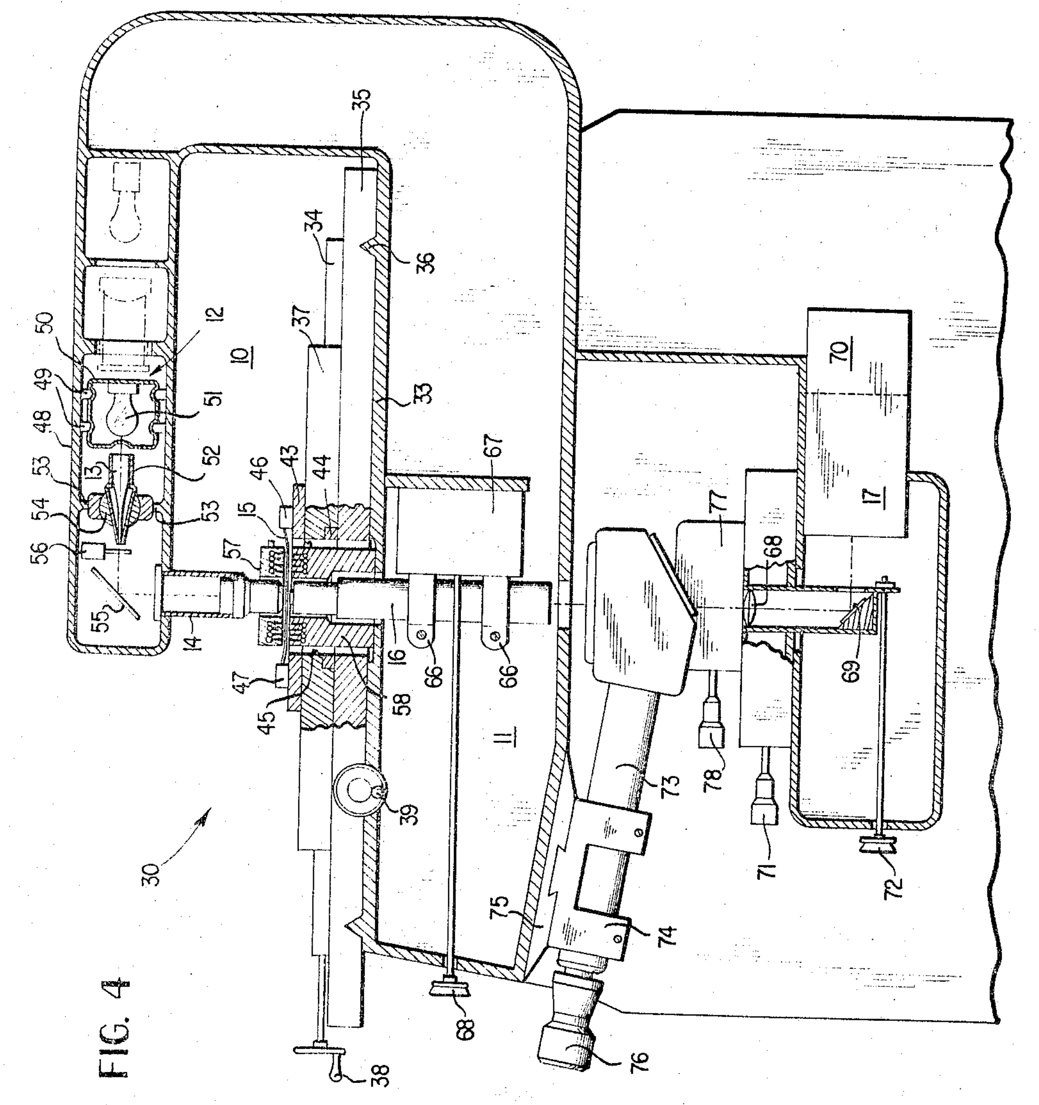
FIGURE 4 illustrates a partially sectioned view of the invention of FIGURE 3.

FIGURES 3 and 4 illustrate a mechanical construction specifically designed to operatively combine the optical elements of FIGURES 1 and 2. Referring now to FIGURES 3 and 4, the high information density data record and readout device of the present invention indicated generally at 30 includes a vibration isolated base member 31 supported by a suitable stationary support 32. Secured to the vibration isolated base 31 is a mounting frame 33 having spaced, transversely extending tracks 34 secured thereto. A table 35 is mounted for movement along the tracks 34 transverse to the mounting frame 33, and the upper surface of the table 35 is provided with parallel spaced tracks 36 which extend at right angles to the tracks 34. A table 37 is mounted upon the tracks 36 for movement in a direction at right angles to the direction of movement of the table 35. Thus, it may be seen that X and Y positioning motions may be obtained by initiating relative movement between the tables 35 and 37. This relative motion may be accomplished by means of a manual X motion controller 38 and a manual Y motion controller 39 which are connected to suitable drive shafts 40 and 41. Automatic table movement may be accomplished by means of suitable X and Y motive drive means 42 which may be connected to the drive shafts 40 and 41.

A circular table 43 is rotatably supported above the table 37 by a circular spindle 44 or by other suitable support means secured to the table 37. The support spindle 44 permits the table 43 to rotate 45 degrees in either direction. As will be noted from FIGURE 4, the central portions of the tables 35, 37 and 43 are removed to provide an aligned aperture 45 extending centrally through the three tables. This aperture permits the tables to be positioned relative to the pickup microscope objective 16 which extends through the aperture 45. A pair of oppositely disposed film holders 46 and 47 are secured to the surface of the rotary table 43 on either side of the central aperture 45. Thus, it may be seen that by selectively actuating the X motion control 38, the Y motion control 39, and the rotatable table 43, a film extending between the film holders 46 and 47 may be accurately positioned relative to the microscope objective 14 which is suspended from an overhead support arm 48 of the mounting frame 33.

With specific reference to FIGURE 4, it may be noted that the overhead support arm 48 internally mounts the optical elements of the projection system 10 of FIGURE 1. Secured to the inner surface of the arm 48 are slide bearing surfaces or tracks 49 which removably mount a light housing 50. Secured within the light housing 50 is a suitable pre-focused light source 51 which is focused upon the entrance orifice 18 of the special aperture 13. Light housing 50 may be designed to permit the introduction of filters between the light source 51 and the special aperture 13 to obtain monochromatic or other special types of light for the analysis of special materials or of information in selected portions of the spectrum. Special aperture 13 is encased in a tapered housing 52, the forward portion of which is secured by bearing surfaces 54 mounted within brackets 53 attached to the inner surface of support arm 48. Bearing surfaces 54 constitute a hemispherical bearing or other suitable bearing construction well known to the art which will enable the rear portion of the housing 52 to be moved universally in all directions while securely maintaining the forward portion of the housing 52 in a fixed position relative to the support arm 48.

A mirror 55 is pivotally mounted to receive the radiant energy from the special aperture 13 and to direct this energy onto the microscope objective 14, which is movably mounted to depend downwardly from the support arm 48. A shutter mechanism 56 may be mounted between the special aperture 13 and the mirror 55 to control the energy transmitted between the special aperture and the microscope objective 14.

Figure 6:
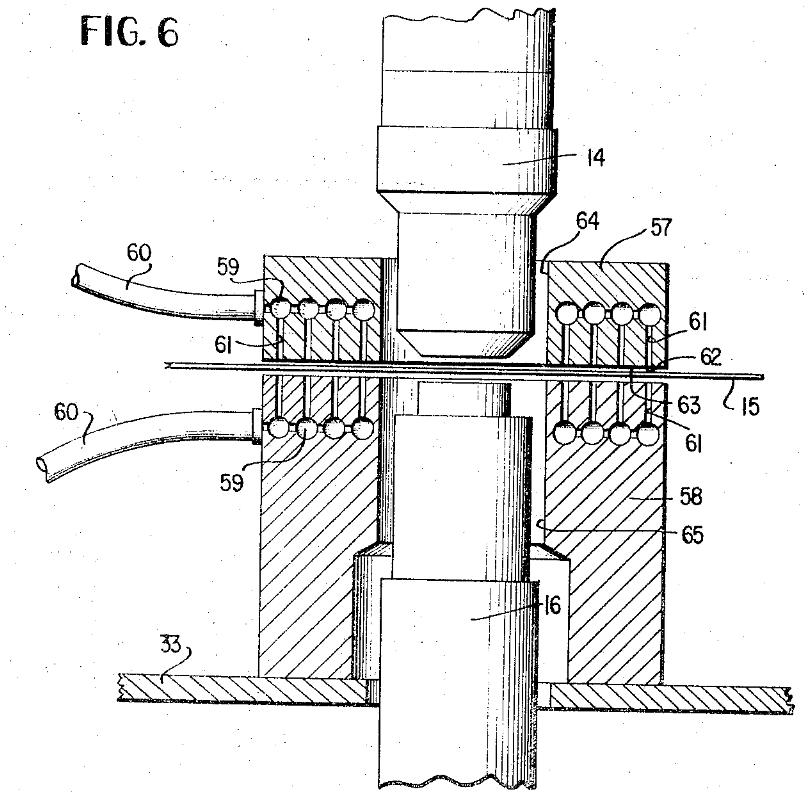
FIGURE 6 illustrates the film specimen hold-down unit incorporated in the present invention.
Figure 7:
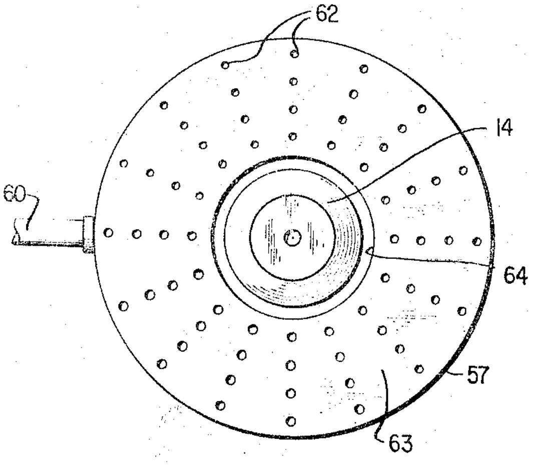
FIGURE 7 is a plan view illustrating the bearing surface of the film hold-down unit of FIGURE 6.

The microscope objective 14 may be adjusted so that the radiant energy transmitted from the special aperture 13 is focused upon a film strip or specimen 15 to produce a sharply defined spot having a diameter in the order of one micron at the point where the radiated energy intercepts the sample surface. This employment of a minute spot of light having a diameter of only one micron necessitates the utilization of film or specimen positioning devices which are capable of retaining a film or specimen in a predetermined plane relative to the optical axis of the beam radiated through the microscope objective 14. The problems attendant with the accurate positioning of the film or specimen 15 are increased when a moving film passing between the film holders 46 and 47 is to be analyzed. The portion of the moving film passing beneath the microscope objective 14 must be positively retained in a predetermined plane relative to the optical axis of the energy passing through the microscope objective, but positioning units utilized for this purpose which physically contact the surface of the moving film tend to scar or injure the film surface. Therefore, air hold-down units 57 and 58, which are retained by the microscope objective 14 and the pickup microscope objective 16, have been developed to accurately position a moving film to receive a one micron spot from the projection system 10. The structure of the air hold-down units 57 and 58 is clearly shown by FIGURES 6 and 7, where it may be observed that the hold-down units constitute a mass of metal or similar material having an appreciable weight. Both the upper hold-down unit 57 and the lower hold-down unit 58 incorporate a plurality of internal air passages 59 which receive air under pressure from a suitable source through supply conduits 60. The main internal air passage 59 extends in a horizontal plane through the hold-down units 57 and 58 and supply air pressure to a plurality of vertically extending capillary air passages 61 which terminate in exit apertures 62 provided in the contact surfaces 63 of the hold-down units. The contact surfaces 63 of the hold-down units 57 and 58 constitute a perfectly flat, smooth surface which is perforated by the plurality of air exit apertures as illustrated by FIGURE 7. Although FIGURE 7 specifically illustrates the contact surface of the upper hold-down unit 57, this figure may also be taken as illustrative of the contact surface 63 of the cooperating lower hold-down unit 58.

In the operation of the air hold-down units 57 and 58, it will be noted that the upper hold-down unit 57 is provided with a central bore 64 through which the microscope objective 14 is inserted, while the lower hold-down unit 58 is provided with a central bore 65 through which the pickup microscope objective 16 is inserted. The bores 64 and 65 are of sufficient diameter to permit vertical movement of the microscope objectives 14 and 16 within the air hold-down units 57 and 58 during focusing operations.

Prior to the focusing of the microscope objectives 14 and 16, the lower air hold-down unit 58 is placed about the pickup microscope objective 16 and is positively supported by the mounting frame 33. Subsequently, the film strip 15 to be analyzed is placed across the contact surface 63 of the lower hold-down unit, and the upper air hold-down unit 57 is then placed about the microscope objective 14 and is permitted to rest upon the upper surface of the film strip 15. The application of air pressure through the conduits 60 causes air under pressure to be emitted from the exit apertures 62 of the upper and lower air hold-down units 57 and 58, and an air cushion results between the surfaces of the film 15 and the corresponding contact surfaces 63 of the upper and lower air hold-down units. In effect, the film strip 15 floats on a cushion of air above the contact surface of the lower air hold-down unit 58, while the upper air hold-down unit 57 floats above the surface of the film strip 15. However, the weight of the upper air hold-down unit is applied to the resulting air cushion and causes the film strip 15 to be positively retained in a predetermined plane while moving past the microscope objectives 14 and 16. The air cushion produced by the air hold-down units 57 and 58 prevents injury to the surface of the film strip during movement.

The pickup optics 11 are mounted upon the mounting support frame 33 and are positioned beneath the film strip 15 to receive the energy radiated through the microscope objective 14 and the film strip 15. As may be noted from FIGURE 4, the pickup microscope objective 16 is mounted by clamps 66 which project from a focus control box 67. The focus control box 67 contains a gearing network of any suitable well known construction which is capable of moving the clamp 66 in either a horizontal or a vertical direction to facilitate the focusing of the pickup microscope objective 16. The operation of the focus control unit 67 is accomplished through the employment of a manual focus control knob 68.

The remainder of the pickup optics 11 include a focusing lens 68 which receives and focuses the energy from the pickup microscope objective 16 upon a reflecting mirror 69. Mirror 69 then directs this energy onto a photo pickup unit 17, which transforms the light energy into electrical energy to be fed to a recorder, computer, or other similar indicating means 70. The focusing lens 68 and the reflecting mirror 69 may be positioned to coincide with the optical axis of the energy emitted from the pickup microscope objective 16 by suitable manual control knobs 71 and 72.

With further reference to FIGURE 4, it will be noted that the focusing lens 68 and the reflecting mirror 69 are spaced below the pickup microscope objective 16 so that additional equipment may be inserted to intercept the optical axis of the energy passing through the pickup microscope objective. When the high information density data record and readout device 30 is utilized for distance measuring operations, as will be hereinafter explained, or when the device is undergoing a focusing operation prior to the analysis of a film strip or similar specimen, a viewing optics unit 73, hereinafter referred to as a telescope, is moved to intercept the optical axis of the energy passing between the pickup microscope objective 16 and the focusing lens 68. Telescope 73 is mounted by means of a bracket 74 upon a slide track 75 secured to the mounting frame 33, and therefore the telescope 73 may be moved in a substantially horizontal plane to intercept the energy passing from the microscope pickup objective 16. This intercepted energy is then redirected for observation through a telescope eyepiece 76.

A pickup slit construction 77 of the type utilized in standard microdensitometers may be inserted between the pickup microscope objective 16 and the focusing lens 68 if the high information density data record and readout device 30 is to be utilized as a standard microdensitometer. For such uses, the illumination source 12 would be replaced by a filter unit, the special aperture 13 would be replaced by a projector slit unit, and an illumination source and slit condenser lens system would be inserted, as illustrated by the dotted lines in FIGURE 4. The slit unit 77 is a standard unit which is controlled by a control knob 78, and may be also utilized to further reduce the size of the one micron spot produced by the projection system 10.

During the basic operation of the high information density data record and readout device 30 of the present invention, the film strip or specimen 15 to be analyzed is positioned beneath the microscope objective 14, and the air holddown units 57 and 58 are operated as previously described in connection with FIGURES 6 and 7. The pre-focused illumination source 51 is then energized, and radiant energy is directed upon the input orifice 18 of the special aperture 13. As this radiant energy passes through the special aperture, the long light waves are removed and the remaining energy is partially collimated by the capillary section 22. A reduced beam of illumination having a diameter in the order of .001 inch is emitted from the exit orifice 19 of the special aperture and is reflected upon the microscope objective 14 by the reflecting mirror 55. The microscope objective 14 reduces the diameter of the reflected beam of energy and focuses it upon the film specimen 15 so that a clearly defined circle of illumination having a diameter in the order of one micron is produced upon the surface of the film strip. This spot of illumination is of sufficient intensity to facilitate the readout of density values on intercepted specimens to a value of log density 3.0 with no resultant harm to standard photographic film materials.

The radiant energy transmitted through the specimen 15 is then received by the pickup microscope objective 16 and directed through the focusing lens 68 to the reflecting mirror 69. The reflecting mirror 69 then reflects the received energy onto the photo pickup unit 17, which transforms the energy into proportionate electrical energy which is then sent to an electrical computer or similar recorder 70.

Prior to this described operation, the high information density data record and readout device 30 must be properly focused in order to obtain an accurate analysis of the test specimen. Both the pickup optics 11 and the projection system 10 must be separately focused relative to the film specimen 15, and the initial focusing of the pickup optics is accomplished visually with the telescope 73. As the pickup system is only a light gathering system for the photo pickup unit 17, the focusing of this system is not particularly critical. During the visual focusing of the pickup system 11, the telescope 73 is moved along the track 75 until the optical axis of the radiant energy from the pickup objective 16 is intercepted. At this point, the eyepiece 76 of the telescope 73 has its focal point in the same position as the face of the photo pickup unit 17. Illumination of the specimen 15 for this initial focusing is accomplished by an auxiliary illumination source (not shown) and during this initial focusing operation, the particular portion of the specimen desired for analysis may be located. To properly position the specimen, the operator peers through the eyepiece 76 of the telescope 73 and manually or automatically actuates the tables 35, 37 and 43. For focus control, the operator actuates the focus control knob 68 to properly focus the pickup objective 16.

After the pickup system 11 is in focus on the specimen, the spot illumination source 51 is energized and the spot is visually focused by adjusting the microscope objective 14 until the spot appears to be at its smallest diameter. At this point, the telescope 73 is removed from beneath the pickup objective 16, and the photo pickup unit 17 with its attendant amplifiers and the recorder 70 are utilized to accomplish further focusing. Only by observing the recorded output as the specimen is scanned repeatedly over the same area, can final maximum focus be achieved. Thus, final focusing of the spot is accomplished by scanning the specimen back and forth over the same position until maximum deviations on a recording are observed.

Figure 5:
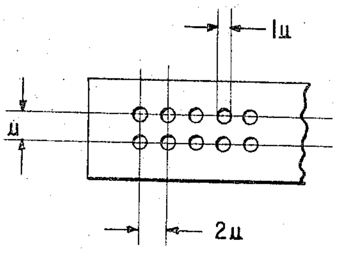
FIGURE 5 illustrates a storage film section produced by the high information density data record and readout device of the present invention.

The ability of the high information density data record and readout device of the present invention to produce and project a clearly defined spot of illumination having a one micron diameter and to pickup and utilize this spot in a data analysis process renders the device valuable for use in performing a wide variety of data processing techniques. For example, the high information density data record and readout device 30 is of particular value when utilized as an instrument for recording information data on a storage medium and for subsequently reading out such stored data. Data information may be printed upon a photosensitive film through the utilization of the projection system 10 as a printing unit. For this usage, either the shutter 56 is employed with the special aperture 13 and the light source 51 to control the printing speed in accordance with the speed of movement of the film strip 15 between the film holders 46 and 47, or the shutter 56 and the light source 51 are eliminated and the light source is replaced by a flash tube which permits high speed recording in addition to accurate density control. The projection system 10 incorporates the capability to print information data upon a sensitized storage medium with a packing density which far surpasses previous systems. For example, as is illustrated by FIGURE 5, the projection system 10 is capable of printing a plurality of dots or spots upon a sensitized storage medium which are approximately one to one-half microns in diameter. These spots, if spaced on two micron centers as illustrated in FIGURE 5, may be easily resolved or read out by the pickup system 11. In addition to the basic storage pattern illustrated by FIGURE 5, a recognizable density pattern up to a maximum density of 3.0 can be used for additional information storage, and the total packing density can be computed as follows:

At 2 microns spacing, there are $$\frac{25,400}{2}=12,700 \text{ elements/inch} \quad (12.7\times 10^3)^2=161\times 10^6$$

total elements/square inch

At a 3.0 density range, readable in .1 steps, there are 30 values $$30\times 161\times 10^6=4850\times 10^6$$
$$=4.85\times 10^9 \text{ elements/square inch}$$

From the above, it may be noted that the high information density data record and readout device 30 of the present invention is capable of printure and reading out a large volume of information data which occupies only a small area on a storage medium. If only ten values of density were used, then each point constitutes one decimal digit and would be easily readable. The density then becomes $1.61\times 10^8$ decimal digits per square inch. Any other radix provides a corresponding packing density.

The high information density data record and readout device 30 of the present invention also may be employed as an improved microdensitometer to provide extremely accurate density readings. Not only does the utilization of the special aperture 13 eliminate the errors arising from the employment of the slit constructions incorporated in previous microdensitometer units, but the capability of the projection system 10 to produce a one micron spot permits the pickup unit to provide an accurate density reading representative of only a minute section of the specimen under analysis. An accurate analysis representing the density of a one micron section of a specimen has been practically unattainable heretofore, as previously known densitometers are incapable of operating to provide an accurate analysis of so minute an area.

A third of the many functions for which the high information density data record and readout device 30 of the present invention may be utilized to perform is the measurement and indication of minute distances on an aerial photograph or similar representation. Thus, if the specimen 15 constituted an aerial photograph or a similar representation from which measured distances were to be taken, an observer could observe the representation illustrated thereon by viewing the specimen through the telescope eyepiece 76. With the representation in view, an operator is enabled to project a spot of energy having a one micron diameter upon the representation, and by moving the spot between points on the representation, an output reading may be obtained. For this purpose, the operating members 38 and 39 for the tables 35 and 37 might be provided with distance indicia from which a visual measurement could be obtained.

It will be readily apparent to those skilled in the art that the present invention provides a novel and improved high information density data record and readout device which is capable of performing a wide variety of data analysis functions wherein an accurate analysis of the conditions existing within a minute area of a storage medium is required. The arrangements and types of components described herein may be subject to numerous modifications well within the purview of this inventor who intends only to be limited to a liberal interpretation of the specification and appended claims.

I claim:

1. A high information density data record and readout device for the transcription and analysis of data upon a medium comprising a projection system, said projection system including a source of radiant energy, aperture means mounted to receive an input beam of radiant energy from said source and operating to filter radiant energy of the long wave lengths from said beam while retaining and substantially collimating radiant energy of the short wave lengths, said aperture means providing a sharply defined output beam constituting substantially collimated radiant energy of the short wave lengths and having a diameter greatly reduced from that of said input beam, and means positioned to focus said output beam upon said medium to establish a sharply defined spot of illumination at the point of interception between said beam and said medium, and electro-optical pickup means positioned adjacent said medium on a side opposite to said projection system, said electro-optical pickup means being aligned to receive radiant energy passing through said medium.

2. A high information density data record and readout device for the transcription and analysis of data upon a medium comprising a mounting support means, a projection system mounted upon said mounting support means, said projection system including a source of radiant energy, an elongated tubular aperture means mounted to receive an input beam of radiant energy from said source, said tubular aperture being tapered to provide a sharply defined output beam having a diameter greatly reduced from that of said input beam, and means positioned to focus said output beam upon said medium to establish a sharply defined spot of illumination at the point of interception between said beam and said medium, and electro-optical pickup means mounted upon said support means and positioned adjacent said medium on a side opposite to said projection system, said electro-optical pickup means being aligned to receive radiant energy passing through said medium.

3. A high information density data record and readout device for the transcription and analysis of data upon a medium comprising a mounting support means, a projection system mounted upon said support means, said projection system including a source of radiant energy, an elongated aperture means having a tapered bore extending centrally therethrough, said aperture means being mounted whereby said bore receives an input beam of radiant energy from said source and emits a sharply defined output beam of substantially collimated radiant energy having a diameter greatly reduced from that of said input beam, and means positioned to focus said output beam upon said medium to establish a sharply defined spot of illumination at the point of interception between said beam and said medium, and electro-optical pickup means mounted upon said support means and positioned adjacent said medium on a side opposite to said projection system, said electro-optical pickup means being aligned to receive radiant energy passing through said medium.

4. The high information density data record and readout device of claim 3 in which said aperture means operates to filter radiant energy of the long wave lengths from said beam while retaining and substantially collimating radiant energy of the short wave lengths, whereby said output beam constitutes substantially collimated radiant energy of the short wave lengths.

5. A high information density data record and readout device for the transcription and analysis of data upon a medium comprising a mounting support means, a projection system mounted upon said support means, said projection system including a source of radiant energy, aperture means mounted to receive an input beam of radiant energy from said source, said aperture means constituting an elongated tapered tube having a tapered bore extending centrally therethrough, said bore originating at an enlarged input aperture for the reception of said input beam and tapering inwardly to a point of interception with an elongated capillary section, said capillary section terminating in a small output orifice and operating to substantially collimate said beam whereby a substantially collimated beam of radiant energy having a diameter greatly reduced from that of said input beam is emitted from said output orifice, and means positioned to focus said output beam upon said medium to establish a sharply defined spot of illumination at the point of interception between said beam and said medium, and electro-optical pickup means mounted upon said support means and positioned adjacent said medium on a side opposite to said projection system, said electro-optical pickup means being aligned to receive radiant energy passing through said medium.

6. The high information density data record and readout device of claim 5 wherein the tapered bore of said aperture is defined by a tubular wall formed from material exhibiting a high reflectance characteristic to radiant energy of the short wave lengths and a low reflectance characteristic to radiant energy of the long wave lengths, whereby radiant energy of the long wave lengths is passed through said wall and thereby eliminated from said output beam.

7. The high information density data record and readout device of claim 5 wherein the tapered bore of said aperture is defined by a tubular glass wall, the outer surface of said wall being coated by a layer of material which exhibits a high reflectance characteristic to radiant energy of the short wave lengths while exhibiting a low reflectance characteristic to radiant energy of the long wave lengths whereby said long wave lengths are removed from the output beam, said coating being of increased thickness adjacent the exit orifice at the terminus of said capillary section to render said terminus opaque to radiant energy.

8. A high information density data record and readout device for the transcription and analysis of data upon a medium comprising a mounting support means, a projection system mounted upon said mounting support means, said projection system including a source of radiant energy, aperture means mounted to receive an input beam of radiant energy from said source and operating to filter radiant energy at the long wave lengths from said beam while retaining and substantially collimating radiant energy of the short wave lengths, said aperture means providing a sharply defined output beam constituting substantially collimated radiant energy of the short wave lengths and having a diameter greatly reduced from that of said input beam, and means positioned to focus said output beam upon said medium to establish a sharply defined spot of illumination having a diameter in the order of one micron at the point of interception between said beam and said medium, medium support and positioning means mounted upon said mounting support means, said support and positioning means being operative to rotate said medium about a central axis and to institute linear movement of said medium in a horizontal plane in two directions, and electro-optical pickup means mounted upon said mounting supporting means and positioned adjacent said medium on a side opposite to said projection system, said electro-optical pickup means being aligned to receive radiant energy passing through said medium.

9. The high information density data record and read-out device of claim 8 in which said medium support and positioning means constitutes a plurality of superimposed, movably mounted table means and control means to initiate the movement of said table means, said table means including a lower table movably mounted upon said mounting support means for linear movement in a horizontal plane, an upper table movably mounted on the surface of said lower table for horizontal linear movement in a direction angularly related to the direction of movement of said lower table, and a rotatable table mounted upon said upper table, said rotatable table being provided with means to support the medium to be analyzed.

10. A high information density data record and read-out device for the transcription and analysis of data upon a medium comprising a mounting support means, a projection system mounted upon said mounting support means, said projection system including a source of radiant energy, aperture means mounted to receive an input beam of radiant energy from said source and operating to filter radiant energy of the long wave lengths from said beam while retaining and substantially collimating radiant energy of the short wave lengths, said aperture means providing a sharply defined output beam constituting substantially collimated radiant energy of the short wave lengths and having a diameter greatly reduced from that of said input beam, a microscope objective positioned to focus said output beam upon said medium to establish a sharply defined spot of illumination having a diameter in the order of one micron at the point of interception between said beam and said medium, electro-optical pick-up means positioned adjacent said medium on a side opposite to said projection system and aligned to receive radiant energy passing through said medium, said electro-optical pickup means including a pickup microscope objective to receive energy passing through said medium, and a photosensitive transducing means mounted to receive energy from said pickup objective, and upper and lower air hold-down means movably mounted about said microscope objective and said pickup microscope objective, said upper and lower hold-down means having bearing surfaces oppositely disposed adjacent the surfaces of said medium and operating to provide an air cushion between said medium and said bearing surfaces.

11. A high information density data record and read-out device for the transcription and analysis of data upon a medium comprising a mounting support means, a projection system mounted upon said mounting support means, said projection system including a source of radiant energy, aperture means mounted to receive an input beam of radiant energy from said source and operating to filter radiant energy of the long wave lengths from said beam while retaining and substantially collimating radiant energy of the short wave lengths, said aperture means providing a sharply defined output beam constituting substantially collimated radiant energy of the short wave lengths and having a diameter greatly reduced from that of said input beam, and means positioned to focus said output beam upon said medium to establish a sharply defined spot of illumination having a diameter in the order of one micron at the point of interception between said beam and said medium, electro-optical pickup means positioned adjacent said medium on a side opposite to said projection system and being aligned to receive radiant energy passing through said medium, said electro-optical pickup means including a microscope objective to receive energy passing through said medium and a photosensitive transducing means spaced from said pickup objective and mounted to receive energy emitted from said pickup objective, and field viewing optical means movably mounted upon said mounting support means, said field viewing optical means being movable to intercept the optical axis between said pickup microscope objective and said photosensitive transducing means, whereby energy emitting from said microscope pickup objective may be visually displayed by said field viewing optical means.

12. In a high information density data record and read-out device for obtaining density data from a specimen, a projection system including a source of radiant energy, aperture means mounted to receive an input beam of radiant energy from said source and operating to filter radiant energy of the long wave lengths from said beam while retaining and substantially collimating radiant energy of the short wave lengths, said aperture means providing a sharply defined output beam constituting substantially collimated radiant energy of the short wave lengths and having a diameter greatly reduced from that of said input beam, and means positioned to focus said output beam upon said specimen to establish a sharply defined spot of illumination in the order of one micron at the point of interception between said beam and said specimen.

13. In a high information density data record and read-out device for obtaining density data from a specimen, a projection system including a source of radiant energy, an elongated aperture means having a tapered bore extending centrally therethrough, said aperture means being mounted whereby said bore receives an input beam of radiant energy from said source and emits a sharply defined output beam of substantially collimated radiant energy having a diameter greatly reduced from that of said input beam, and means positioned to focus said output beam upon said specimen to establish a sharply defined spot of illumination in the order of one micron at the point of interception between said beam and said specimen.

14. In a high information density data record and read-out device for obtaining density data from a specimen, a projection system including a source of radiant energy, aperture means mounted to receive an input beam of radiant energy from said source, said aperture means constituting an elongated tapered tube having a tapered bore extending centrally therethrough, said bore originating at an enlarged input aperture for the reception of said input beam and tapering inwardly to a point of interception with an elongated capillary section, said capillary section terminating in a small output orifice and operating to substantially collimate said beam, whereby a substantially collimated beam of radiant energy having a diameter greatly reduced from that of said input beam is emitted from said output orifice, and means positioned to focus said output beam upon said specimen to establish a sharply defined spot of illumination in the order of one micron at the point of interception between said beam and said specimen.

15. The projection system of claim 14 wherein the tapered bore of said aperture is defined by a tubular wall formed from material exhibiting a high reflectance characteristic to radiant energy of the short wave lengths and a low reflectance characteristic to radiant energy of the long wave lengths, whereby radiant energy of the long wave lengths is passed through said wall and is thereby eliminated from said output beam.

16. A collimator lens structure for producing micron size light spots for optical transcription and readout devices in which light is supplied to a specimen from a light source, comprising a substantially funnel-shaped tubular element, a coating layer on said element having a high reflectivity for the relatively short-wave-lengths of light and a low reflectivity for the relatively long-wave-lengths of light, said tubular element being provided with a light inlet aperture and with a light outlet aperture and tapering continuously over a major portion of its length from within an area of said inlet aperture to within the area of the outlet aperture, and said tubular element terminating in a capillary section in which the wall thickness of the tubular element also decreases substantially continuously in the direction toward the light outlet aperture.

17. A lens structure according to claim 16, wherein the coating layer is thicker within the area of the capillary section than within the remaining area of the tubular element.

18. A lens structure according to claim 16, wherein said tubular element consists of glass.

19. An apparatus for storing data information upon a sensitized film medium, comprising means producing a beam of radiant energy from a source of illumination, means for selectively interrupting said beam in accordance with data information, means including a tapered filter tube operatively associated with said interrupted beam for directing said interrupted beam through the tapered filter tube to filter therefrom radiant energy of the long wavelengths and to obtain an output beam of substantially collimated radiant energy having a reduced diameter, means optically focusing and further reducing the diameter of said beam of substantially collimated radiant energy and for further reducing the diameter thereof, means directing said reduced beam upon said film to produce a clearly defined spot of illumination of the order of one micron at the point of interception between said beam and said film, and means for moving said film to implement the transcription of information thereupon by said spot.

20. An apparatus for obtaining density information from a specimen, comprising means providing a beam of radiant energy from an illumination source, means including tapered filter tube means for directing said beam through said filter tube means to filter therefrom energy of the long wavelengths and to obtain an output beam of substantially collimated radiant energy having a reduced diameter, means for optically focusing and further reducing the diameter of said reduced beam, means for directing the further reduced beam upon said specimen to produce a clearly defined spot of illumination of the order of one micron at the point of interception between said beam and said specimen, receiving means operatively associated with said specimen for optically receiving the light energy transmitted through said specimen by said spot, and means operatively connected with said receiving means for converting the received light energy into proportionate electrical energy.

References Cited by the Examiner

UNITED STATES PATENTS

| | | | |
|---|---|---|---|
| 2,801,343 | 7/1957 | Johnson | 250—234 |
| 2,983,446 | 5/1961 | Zogg | 235—61.11 |
| 3,141,958 | 7/1964 | Stickel et al. | 235—61.11 |
| 3,187,627 | 6/1965 | Kapany | 88—39 |

MAYNARD R. WILBUR, *Primary Examiner.*

A. L. NEWMAN, *Assistant Examiner.*